United States Patent
Migliaccio et al.

(10) Patent No.: US 7,719,463 B2
(45) Date of Patent: May 18, 2010

(54) REFLECTARRAY AND A MILLIMETRE WAVE RADAR

(75) Inventors: Claire Blandine Migliaccio, Nice (FR); Binh Duong Nguyen, Vung Tau (VN); Christian Yves Dominique Pichot Du Mezeray, Antibes (FR); Kazuo Yamamoto, Tokyo (JP); Naruto Yonemoto, Tokyo (JP); Kimio Yamada, Tokyo (JP)

(73) Assignees: Centre National de la Recherche Scientifique (C.N.R.S.), Paris (FR); Electronic Navigation Research Institute Independent Administrative Institution, Tokyo (JP); Universite de Nice Sophia Antipolis, Nice (FR)

( * ) Notice: Subject to any disclaimer, the term of this patent is extended or adjusted under 35 U.S.C. 154(b) by 21 days.

(21) Appl. No.: 12/092,274

(22) PCT Filed: Oct. 27, 2006

(86) PCT No.: PCT/IB2006/003024

§ 371 (c)(1), (2), (4) Date: Nov. 18, 2008

(87) PCT Pub. No.: WO2007/052112

PCT Pub. Date: May 10, 2007

(65) Prior Publication Data
US 2009/0153391 A1 Jun. 18, 2009

(30) Foreign Application Priority Data
Nov. 3, 2005 (EP) ............................. 2005/014220

(51) Int. Cl.
*G01S 13/00* (2006.01)
*H01Q 13/00* (2006.01)

(52) U.S. Cl. .................... 342/188; 343/775; 343/781 R
(58) Field of Classification Search ................. 342/188; 343/755, 756, 775, 779, 781 R, 781 P, 824, 343/832, 834–840, 893, 912, 700 MS
See application file for complete search history.

(56) References Cited

U.S. PATENT DOCUMENTS 4,905,014 A * 2/1990 Gonzalez et al. ............ 343/909

(Continued)

OTHER PUBLICATIONS

A C/ka dual frequency dual Layer circularly polarized reflectarray antenna with microstrip ring elements Han, C.; Rodenbeck, C.; Huang, J.; Kai Chang; Antennas and Propagation, IEEE Transactions on vol. 52, Issue 11, Nov. 2004 pp. 2871-2876.*

(Continued)

*Primary Examiner*—Thomas H Tarcza
*Assistant Examiner*—Peter M Bythrow
(74) *Attorney, Agent, or Firm*—Young & Thompson

(57) ABSTRACT

The reflectarray comprises an array of patch elements (10-13). Each patch element has a cut ring shape formed of a conductive ring with at least one crossing gap. The outer diameter and inner diameter and crossing gap are adjusted so that a phase shift $\beta$ defined by the following relations is different from zero: $\phi(E_{ox})=\phi(E_{ix})+\alpha$ (1) $\phi(E_{oy})=\phi(E_{iy})+\alpha+\beta$ (2) where: $-\phi(E_{ox})$ and $\phi(E_{oy})$ are the phases of the orthogonal components and of the reflected wave, respectively, $-\phi(E_{ix})$ and $\phi(E_{iy})$ are the phases of orthogonal components and of the incident wave, respectively, $-\alpha$ is a phase angle.

12 Claims, 7 Drawing Sheets

U.S. PATENT DOCUMENTS

| | | | | |
|---|---|---|---|---|
| 5,451,969 | A | * | 9/1995 | Toth et al. ............. 343/781 CA |
| 5,892,487 | A | * | 4/1999 | Fujimoto et al. ............ 343/840 |
| 6,020,853 | A | * | 2/2000 | Richards et al. ........ 343/700 MS |
| 6,081,234 | A | * | 6/2000 | Huang et al. .......... 343/700 MS |
| 6,081,235 | A | * | 6/2000 | Romanofsky et al. . 343/700 MS |
| 6,384,787 | B1 | * | 5/2002 | Kim et al. ............. 343/700 MS |
| 6,429,823 | B1 | * | 8/2002 | Bains et al. .................. 343/755 |
| 6,441,787 | B1 | * | 8/2002 | Richards et al. ........ 343/700 MS |
| 6,590,544 | B1 | * | 7/2003 | Filipovic .................... 343/753 |
| 6,768,468 | B2 | * | 7/2004 | Crouch et al. ............... 343/753 |
| 6,992,630 | B2 | * | 1/2006 | Parsche ............... 343/700 MS |
| 7,042,420 | B2 | * | 5/2006 | Ebling et al. ............. 343/911 L |
| 7,161,539 | B2 | * | 1/2007 | Chang et al. .......... 343/700 MS |
| 7,439,913 | B2 | * | 10/2008 | Chang et al. .......... 343/700 MS |
| 7,605,768 | B2 | * | 10/2009 | Ebling et al. ................. 343/754 |

OTHER PUBLICATIONS

Han et al., "A C/Ka Dual Frequency Dual Layer Circularly Polarized Reflectarray Antenna with Microstrip Ring Elements," IEEE Trans. on Antennas & Prop., vol. 52, No. 11, pp. 2871-2876 (Nov. 2004).

Huang et al., "A Ka-Band Microstrip Reflectarray with Elements Having Variable Rotation Angles," IEEE Trans. on Antennas & Prop., vol. 46, No. 5, pp. 650-656 (May 1998).

Bruete et al., "Resonance and Cross-Polarization Effects in Conventional and Complementary Split Ring Resonators Periodic Screens," IEEE Antennas & Prop, Symp., pp. 794-797 (Jul. 3, 2005).

Han et al., "Ka-Band reflectarray using ring elements," Elec. Lets., vol. 39, No. 6, pp. 491-493 (Mar. 20, 2003).

Herben et al., "Some Developments in Fresnel Zone Plate Lens Antennas," IEEE Antennas & Prop. Symp., pp. 726-729 (Jul. 11, 1999).

Strassner et al., "Circularly Polarized Reflectarray with Microstrip Ring Elements Having Variable Rotation Angles," IEEE Trans. on Antennas & Prop., vol. 52, No. 4, pp. 1122-1125 (Apr. 2004).

Misran et al., "Concentric Split Ring Element for Dual Frequency Reflectarray Antennas," Elec. Letters, vol. 39, No. 25, pp. 1776-1777 (Dec. 11, 2003).

Chuprin et al., "Resonant Frequencies of Open and Closed Loop Frequency Selective Surface Arrays," Elec. Lets., vol. 36, No. 19, pp. 1601-1603 (Sep. 14, 2000).

Nguyen et al., "94 GHz Zonal Ring Reflector for Helicopter Collision Avoidance," Elec. Lets., vol. 40, No. 20, pp. 1241-1242 (Sep. 30, 2004).

Shaker et al., "Reduced Angular Sensitivity Frequency Selective Surface," Elec. Lets., vol. 29, No. 18, pp. 1655-1657 (Sep. 2, 1993).

Ye et al., "On the Radiation Characteristics of Fresnel Zone Plate Antenna," Dig. Of Antenna & Prop. Soc. Int. Symp., vol, 3, pp. 2236-2239 (Jun. 20, 1994).

Kawano et al., "A Grid Array Antennas with C-Figured Elements," Elec. & Comm. In Japan, vol. 85, No. 1, Part 1, pp. 58-68 (2002).

* cited by examiner

REFLECTARRAY AND A MILLIMETRE WAVE RADAR

FIELD OF THE INVENTION

The present invention relates to a reflectarray and a millimetre wave radar.

BACKGROUND OF THE INVENTION

Reflectarrays are particularly useful to build antenna having specific purposes.

There exist reflectarrays having an array of patch elements, each patch element being designed to shift a phase of an incident polarized electromagnetic wave by a predetermined phase angle.

The phase angle represents the delay or the advance in time introduced by the patch element between the incident electromagnetic wave and the outgoing or reflected electromagnetic wave.

For some specific applications, it is needed patch elements having both:

a) the capability to shift the phase of the incident polarized electromagnetic wave by the predetermined phase angle, and b) the capability to set a predetermined phase difference between two orthogonal components of the incident polarized electromagnetic wave.

By orthogonal components of the electromagnetic wave, we mean the decomposition into two orthogonal components of the electric field vector in a two-dimension plane. The two-dimension plane is perpendicular to the propagation direction of the electromagnetic wave. Each orthogonal components has its own phase. The difference between the phase of each orthogonal component is called "phase difference".

For instance, if the phase difference is equal to 0° or 180°, the electromagnetic wave is said to have a linear polarization. If the phase difference is equal to + or −90° and the amplitudes of the orthogonal components are equal, the electromagnetic wave is said to have a circular polarization. For other values of the phase difference, the electromagnetic wave is said to have a elliptical polarization.

Rectangular patch elements having both capabilities a) and b) have been disclosed in the following reference D1:

"Millimeter-Wave Folded Reflector Antennas with High Gain, Low Loss, and Low Profile", Wolfgang Menzel, Dietmar Pilz and Maysoun Al-Tikriti, IEEE Antennas and Propagation Magazine, Vol. 44, No. 3, June 2002.

It is desirable to have patch elements other than rectangular patch elements that have both capabilities a) and b).

SUMMARY OF THE INVENTION

Accordingly, it is an object of the invention to provide a reflectarray using alternative patch elements having both capabilities a) and b).

The invention provides a reflectarray wherein each patch element has a cut ring shape formed of a conductive ring with at least one crossing gap, the conductive ring having an outer diameter $r_o$ and an inner diameter $r_i$ and each crossing gap having a respective width h. Diameters $r_o$, $r_i$ and width $\underline{h}$ are adjusted so that a phase shift β defined by the following relations is different from zero:

$$\phi(E_{ox}) = \phi(E_{ix}) + \alpha \quad (1)$$

$$\phi(E_{oy}) = \phi(E_{iy}) + \alpha + \beta \quad (2)$$

where:

$E_{ix}$ and $E_{iy}$ are the orthogonal components of the incident polarized electromagnetic wave collinear with directions $u_x$ and $u_y$, respectively, $E_{ox}$ and $E_{oy}$ are the orthogonal components of the reflected polarized electromagnetic wave collinear with directions $u_x$ and $u_y$, respectively, $\phi(E_{ox})$ and $\phi(E_{oy})$ are the phases of the orthogonal components $E_{ox}$ and $E_{oy}$, respectively, $\phi(E_{ix})$ and $\phi(E_{iy})$ are the phases of the orthogonal components $E_{ix}$ and $E_{iy}$, respectively, α is the phase angle, and β is the phase shift.

Patch elements having a cut ring shape have both capabilities a) and b). Furthermore, to obtain a reflectarray having patch elements introducing phase angle from 0° to 360° at a working frequency of 94 GHz, it is easier to use patch elements having cut ring shape because this can be obtained using a substrate thicker than if rectangular patch elements were used. The substrate is the dielectric material layer that is interposed between the patch elements and a ground plane. Having a thicker substrate makes the manufacturing process of the reflectarray easier.

The embodiments of the above reflectarray may comprise one or several of the following features.

diameters $r_o$, $r_i$ and width h are adjusted so that $\phi(E_{ox}) - \phi(E_{oy}) = \pm 90°$ from an incident electromagnetic wave with a linear polarization, phase shift β is equal to 180°, none of the crossing gap is diametrically opposite to another crossing gap of the same conductive ring, the conductive ring has only one crossing gap, the patch element has only one conductive ring, at least one patch element has an inner disk within its cut ring shape, the patch elements are arranged into P Fresnel zones according to their respective phase angles, P being an integer number greater or equal to four and the radius ($r_n$) of each Fresnel zone being given by the following relation:

$$r_n \sqrt{\frac{2nf\lambda}{P} + (n\lambda/P)^2}$$

where:

n is the rank order of the Fresnel zones, n=1 corresponding to the most inner Fresnel zone;

λ is the wavelength of the electromagnetic wave;

f is the focal length of the reflectarray;

P is the number of Fresnel zones used.

every patch element placed into the same Fresnel zone are designed to shift the phase of the incident polarized electromagnetic wave by the same predetermined phase angle α, and patch elements of different Fresnel zones are designed to shift the phase of the incident electromagnetic wave by different predetermined phase angles α.

the patch element has a direction $u_x$ defined by the line that extends from the center of the conductive ring through one gap, and the direction $u_x$ of some patch elements are rotated with respect to the direction $u_x$ of other patch elements to adjust the phase angle of the rotated patch element, each patch element is a printed microstrip element directly on top of a dielectric substrate, a ground plane being fixed directly at the bottom of the dielectric substrate.

The above embodiment of the reflectarray presents the following advantages:
- the inner circular disk of a patch element can be used to further adjust the phase angle;
- arranging the patch elements in Fresnel zones limits the number of zones used to transform a spherical electromagnetic wave into a plane electromagnetic wave and vice-versa;
- rotating the patch element direction allows to use a same patch element to obtain different phase angles;
- microstrip patch elements decrease the manufacturing cost of the reflectarray.

The invention also relates to a millimetre wave radar comprising:
- a primary source to radiate a linearly polarized electromagnetic wave, the linear polarization being parallel to a direction $\underline{y}$,
- the above reflectarray, wherein:
- each cut ring shape is formed of a conductive ring with at least one crossing gap, and each patch element has a direction $\underline{u_x}$ defined by a line that extends from the center of the conductive ring through one crossing gap, the direction $\underline{u_x}$ being non-collinear with direction $\underline{y}$, and
- the inner and outer diameters $r_o$, $r_i$ and width $\underline{h}$ of each patch element are adjusted so that the phase difference between two orthogonal components of the linearly polarized electromagnetic wave is different from 0° and 180°.

The above radar is able to receive both left-hand and right-hand elliptically polarized electromagnetic waves. This makes detection of a high voltage power line easier, for example. It also reduces the number of millimetric wave sources needed to detect a high voltage power line.

The embodiments of the above radar may comprise the following feature:
- the inner and outer diameters $r_o$, $r_i$ and width $\underline{h}$ are adjusted so that the predetermined phase difference between the two orthogonal components of the reflected polarized electromagnetic wave is equal to +90° or −90°, and the direction $\underline{u_x}$ of each patch element is tilted by 45°, 135°, 225° or 315° with respect to direction $\underline{y}$.

The above embodiment of the radar transforms linearly polarized electromagnetic waves into circularly polarized electromagnetic waves. This increases the probability to correctly detect high-voltage power lines because the radar signature of these power lines obtained in response to a radiated circularly polarized electromagnetic wave is easier to identify.

This and other aspects of the invention will be apparent from the following description, drawings and claims.

DETAILED DESCRIPTION

Figure 1:
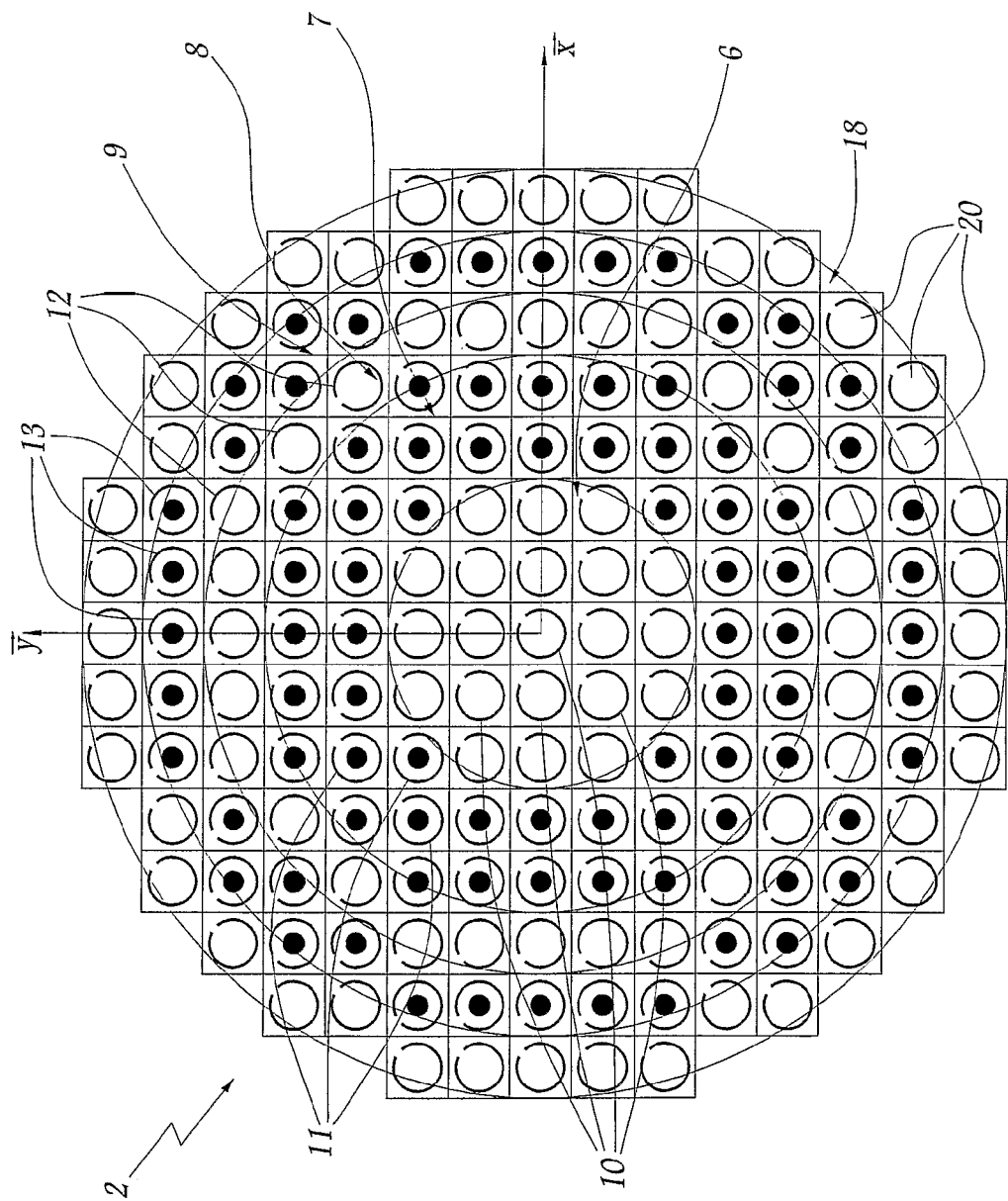
FIG. 1 is a schematic view of the front face of a reflectarray.

FIG. 1 shows the flat front face of a reflectarray 2 having both capabilities a) and b).

Reflectarray 2 has a circular aperture. The front face is a disk of about 130 mm to 150 mm in diameter.

FIG. 1 shows one horizontal axis $\vec{X}$ and one vertical axis $\vec{Y}$ that extend from the center of the disk.

Reflectarray 2 is designed to transform an incident spherical electromagnetic wave into an outgoing plane electromagnetic wave. To do so, the front face of reflectarray 2 is divided into P Fresnel zones. Fresnel zones are concentric annular zones around an inner circular zone. Each zone corresponds to a predetermined phase angle in order to transform the spherical wave into a plane wave and vice-versa.

The radius $r_n$ of each Fresnel zone is given by the following relation:

$$r_n \sqrt{\frac{2nf\lambda}{P} + (n\lambda/P)^2}$$

where:
- n is the rank order of the Fresnel zones, n=1 corresponding to the inner circular Fresnel zone;
- λ is the wave length of the electromagnetic wave;
- f is the focal length of the reflectarray;
- P is the number of Fresnel zones used.

For simplicity, reflectarray 2 has only four Fresnel zones, 6 to 9.

Zone 6 is the inner circular zone. Zones 7 to 9 are the successive annular zones from the inner annular zone to the outer annular zone.

Each zone is filled with microstrip patch elements introducing the same respective phase angle. More precisely, zone 6 is filled with patch elements 10 designed to shift the incident electromagnetic wave by a phase angle equal to zero degree.

Zones 7, 8 and 9 are filled with patch elements 11 to 13, respectively. Patch elements 11 to 13 are designed to shift the incident electromagnetic wave by phase angles equal to 90°, 180°, and 270°, respectively.

For example purposes only, zone 9 is surrounded by a further annular zone 18 which is filled with patch elements 20. Patch elements 20 are designed to shift the incident electromagnetic wave by a phase angle equal to zero degree. For example, each patch element 20 is identical to patch element 10.

Figure 2B:
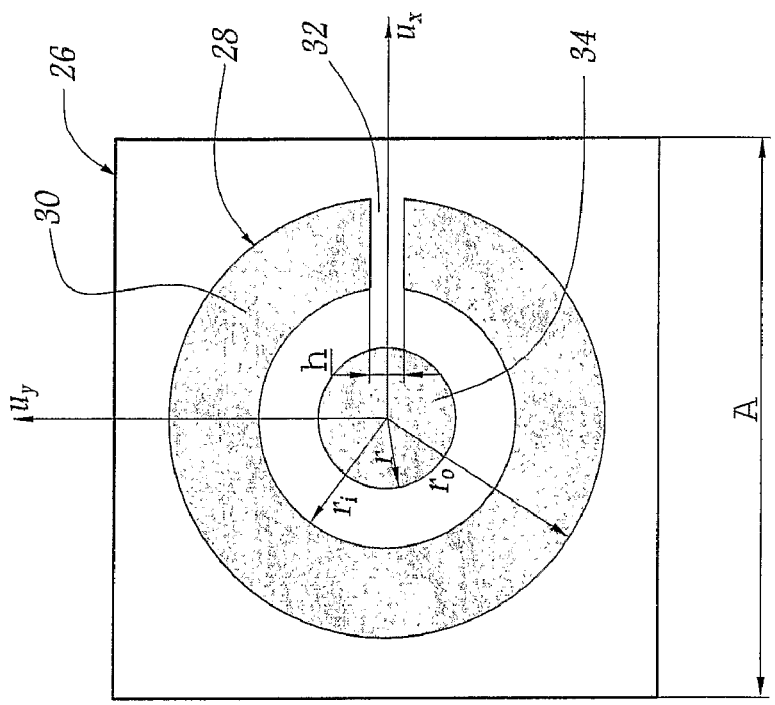
FIGS. 2a and 2b are schematic diagrams of two different patch elements used in the reflectarray of FIG. 1.
Figure 2A:
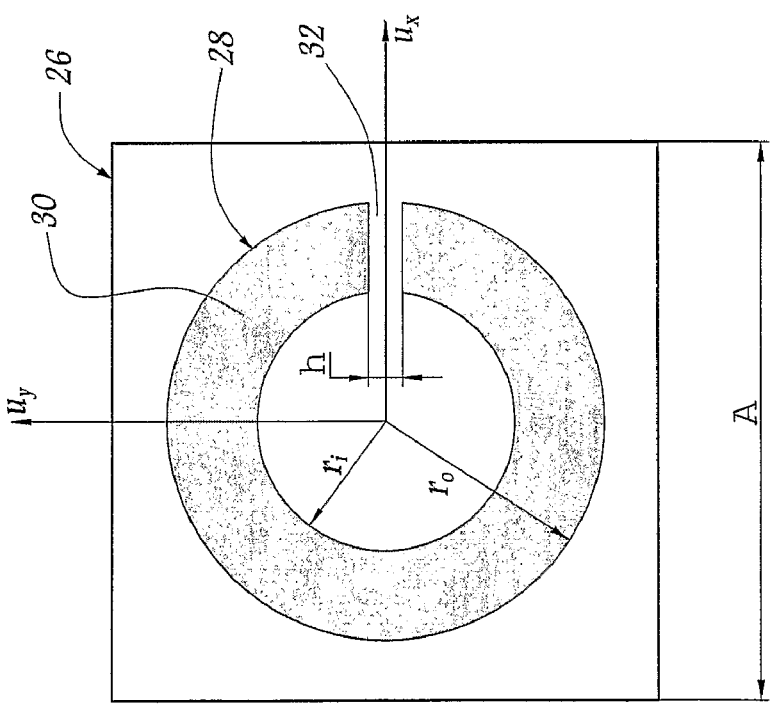

Patch elements 10, 12 and 20 are illustrated in more details in FIG. 2a and patch elements 11 and 13 are illustrated in more details in FIG. 2b.

Each patch element is housed within a square 26. The length of each side of square 26 is equal to $\underline{A}$. Length $\underline{A}$ sets the spacing between two adjacent patch elements. Conveniently, length $\underline{A}$ is chosen equal to λ/2, where λ is the wavelength λ/2<$\underline{A}$<λ of the electromagnetic wave to be reflected. In other embodiment, length $\underline{A}$ is superior or equal to λ/2 and strictly inferior to λ.

For example, for an electromagnetic wave having a frequency of 94 GHz, length $\underline{A}$ is equal to 1.6 mm.

Both patch elements of FIGS. 2a and 2b have a cut ring shape 28. Cut ring shape 28 is formed of a conductive ring 30 with a crossing gap 32.

Ring 30 is made from a strip of conductive material. Ring 30 has an inner diameter $r_i$ and an outer diameter $r_0$. Preferably, the strip has a constant width of more than 100 μm in width.

Gap 32 is a non-conductive gap that cuts ring 30 to transform ring 30 into an electrically open circuit. For example, gap 32 has a constant width h. Gap 32 extends radially from the center of ring 30.

Each patch element has a direction $u_x$ defined by the line extending from the center of ring 30 through the middle of gap 32.

Patch element of FIG. 2b has an inner disk 34 made of conductive material. Disk 34 and open ring 30 are concentric. Disk 34 has a radius r.

Patch element of FIG. 2a differs from patch element of FIG. 2b by the fact that it does not have any inner disk like disk 34.

FIGS. 2a and 2b show also a direction $u_y$ which is perpendicular to direction $u_x$.

Figure 3:
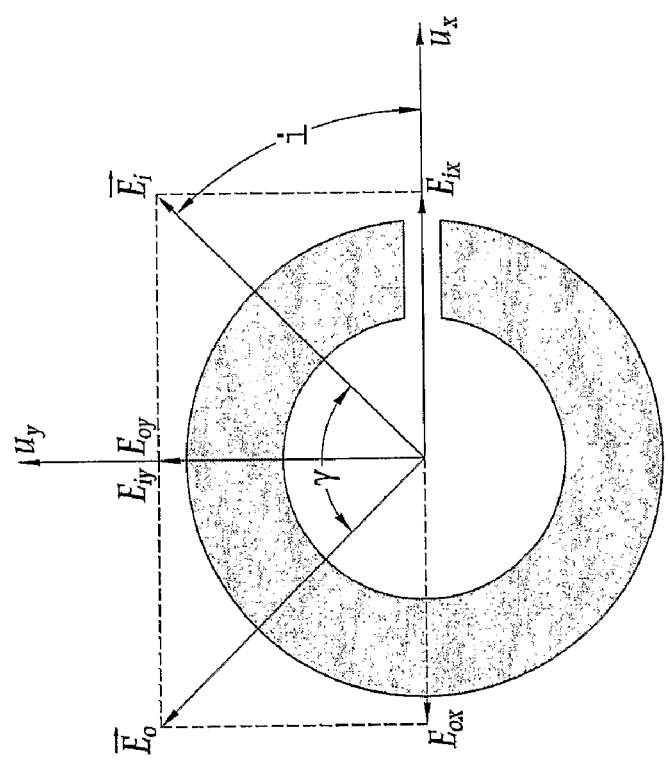
FIG. 3 schematically illustrates the behaviour of the patch elements of FIGS. 2a and 2b.

As illustrated in FIG. 3, the electric field vector $\vec{E_i}$ of a polarized incident magnetic wave can be decomposed into two orthogonal components $\vec{E_{ix}}$ and $\vec{E_{iy}}$. $\vec{E_{ix}}$ and $\vec{E_{iy}}$ correspond to the projection of vector $\vec{E_i}$ on directions $u_x$ and $u_y$, respectively. Thus, the vectorial sum of $\vec{E_{ix}}$ and $\vec{E_{iy}}$ is equal to vector $\vec{E_i}$.

It has been discovered that component $\vec{E_{ix}}$ is not reflected like component $\vec{E_{iy}}$. More precisely, the phase of an electromagnetic wave that is polarized in a direction parallel to direction $u_x$ is not shifted like the phase of an electromagnetic wave that is polarized in a direction parallel to direction $u_y$. Consequently, the patch elements of FIGS. 2a and 2b introduce a phase shift β between the orthogonal components $\vec{E_{ox}}$ and $\vec{E_{oy}}$ of the outgoing electric field $\vec{E_o}$ of the reflected electromagnetic wave. Components $\vec{E_{ox}}$ and $\vec{E_{oy}}$ correspond to the projection of vector $\vec{E_o}$ on directions $u_x$ and $u_y$, respectively.

Furthermore, these patch elements shift the phase of the incident electromagnetic wave by a predetermined phase angle α. As a result, there exists a relation between the phases of the orthogonal components of the incident electric field, the outgoing electric field and angles α and β. For example, the following relation can be written:

$$\phi(E_{ox}) = \phi(E_{ix}) + \alpha \quad (1)$$

$$\phi(E_{oy}) = \phi(E_{iy}) + \alpha + \beta \quad (2)$$

where:

$\phi(E_{ox})$ and $\phi(E_{oy})$ are the phases of the orthogonal components $\vec{E_{ox}}$ and $\vec{E_{oy}}$, respectively, $\phi(E_{ix})$ and $\phi(E_{iy})$ are the phases of the orthogonal components $\vec{E_{ix}}$ and $\vec{E_{iy}}$, respectively, α is the phase angle, and β is the phase shift.

Predetermined phase angle α and phase shift β can be obtained by adjusting length A, width h and radius $r_i$ and $r_o$. The adjustment of length A, width h and radius $r_i$ and $r_o$ is done experimentally using simulation software, for example.

For illustration, the following table 1 gives the phase $\phi(E_{oy})$ and $\phi(E_{ox})$ for a reflectarray having a substrate which is 380 μm thick. The substrate is made in duroïd which has a relative permittivity equal to 2.2. The values in table 1 are obtained from a linearly polarized incident electromagnetic wave having a frequency of 94 GHz. The first value before the "/" corresponds to phase $\phi(E_{oy})$ and the value after the "/" corresponds to phase $\phi(E_{ox})$.

TABLE 1

| h (mm) | 0.1 | 0.2 | 0.3 | 0.4 |
|---|---|---|---|---|
| Phase ($r_o = 0.7$; $r_i = 0.6$ mm) | −26°/−58° | −10°/−57° | 7°/−57° | 35°/−56° |
| Phase ($r_o = 0.7$; $r_i = 0.5$ mm) | 5°/−40° | 30°/−39° | 59°/−39° | 95°/−37° |
| Phase ($r_o = 0.65$; $r_i = 0.5$ mm) | 27°/−42° | 68°/−41° | 105°/−38° | 148°/−37° |
| Phase ($r_o = 0.65$; $r_i = 0.4$ mm) | 63°/−21° | 102°/−20° | 140°/−17° | 173°/−14° |
| Phase ($r_o = 0.6$; $r_i = 0.5$ mm) | 80°/−44° | 124°/−42° | 163°/−41° | 190°/−38° |
| Phase ($r_o = 0.6$; $r_i = 0.4$ mm) | 105°/−20° | 147°/−17° | 178°/−12° | 208°/−8° |
| Phase ($r_o = 0.55$; $r_i = 0.4$ mm) | 145°/−14° | 183°/−10° | 204°/−6° | 219°/−5° |
| Phase ($r_o = 0.55$; $r_i = 0.4$ mm) | 162°/17° | 193°/23° | 211°/31° | 227°/43° |
| Phase ($r_o = 0.5$; $r_i = 0.4$ mm) | 187°/−6° | 207°/−4° | 220°/18° | 228°/38° |
| Phase ($r_o = 0.5$; $r_i = 0.3$ mm) | 188°/40° | 211°/50° | 226°/66° | 235°/85° |
| Phase ($r_o = 0.45$; $r_i = 0.3$ mm) | 209°/77° | 224°/97° | 233°/118° | 242°/137° |
| Phase ($r_o = 0.4$; $r_i = 0.3$ mm) | 221°/136° | 231°/145° | 239°/166° | 246°/179° |

It is reminded that since the incident electromagnetic wave has a linear polarization, phase $\phi(E_{ix})$ is equal to phase $\phi(E_{iy})$.

The following Table 2 shows phase shift β corresponding to the result obtained in Table 1.

TABLE 2

| h (mm) | 0.1 | 0.2 | 0.3 | 0.4 |
|---|---|---|---|---|
| Phase ($r_o = 0.7$; $r_i = 0.6$ mm) | 32° | 47° | 50° | 91° |
| Phase ($r_o = 0.7$; $r_i = 0.5$ mm) | 45° | 69° | 98° | 132° |
| Phase ($r_o = 0.65$; $r_i = 0.5$ mm) | 69° | 129° | 143° | 185° |
| Phase ($r_o = 0.65$; $r_i = 0.4$ mm) | 74° | 122° | 137° | 159° |
| Phase ($r_o = 0.6$; $r_i = 0.5$ mm) | 124° | 166° | 122° | 228° |
| Phase ($r_o = 0.6$; $r_i = 0.4$ mm) | 125° | 164° | 166° | 200° |
| Phase ($r_o = 0.55$; $r_i = 0.4$ mm) | 159° | 193° | 210° | 224° |
| Phase ($r_o = 0.55$; $r_i = 0.4$ mm) | 179° | 211° | 180° | 184° |
| Phase ($r_o = 0.5$; $r_i = 0.4$ mm) | 193° | 161° | 202° | 190° |
| Phase ($r_o = 0.5$; $r_i = 0.3$ mm) | 148° | 161° | 160° | 150° |
| Phase ($r_o = 0.45$; $r_i = 0.3$ mm) | 132° | 127° | 115° | 115° |
| Phase ($r_o = 0.4$; $r_i = 0.3$ mm) | 85° | 86° | 65° | 67° |

Radius r of disk 34 is a further parameter that can be used to adjust phase angle α. Radius r has nearly no influence on phase shift β.

In the particular case of reflectarray 2, radius $r_o$, $r_i$, r and width h of patch elements 10 to 13 are adjusted so that phase shift β is equal to 180°. As a result, the amplitude of one of components $\vec{E}_{ox}$ or $\vec{E}_{oy}$ is equal to $-\vec{E}_{ix}$ or $-\vec{E}_{iy}$, respectively. In FIG. 3, the amplitude of component $\vec{E}_{ox}$ is equal to the amplitude of $E_{ix}$ multiplied by −1. Thus, the linear polarization direction of the incident electromagnetic wave is shifted by an angle γ after having being reflected by such a patch element. The value of angle γ depends on an angle i between the linear polarization direction of the incident magnetic wave and direction $u_x$. For example, angle i is chosen equal to 45°, 135°, 225° or 315° in order to obtain an angle γ equal to 90°.

For example, in FIG. 1, reflector 2 is designed to reflect an incident electromagnetic wave which has a linear polarization aligned with direction y. Accordingly, patch elements 10 and 11 are arranged in zones 6 and 7 so that their respective direction $u_x$ makes an angle i equal to 45° with respect to direction y.

The structure of phase elements 12 and 13 are identical to the structure of phase elements 10 and 11, respectively. However, the direction of patch elements 12 and 13 are tilted by 90° with respect of direction of patch elements 10 and 11. In fact, rotating patch elements 10 and 11 by 90° increases phase angle α by 180°. As a result, it is not necessary to design a new structure for patch elements 12 and 13 and the design of reflectarray 2 is simplified.

During operation of reflector 2, an incident linearly polarized electromagnetic wave is transformed into an outgoing linearly polarized electromagnetic wave. The outgoing electromagnetic wave has a polarization direction which is shifted by 90° with respect to the polarization direction of the incident electromagnetic wave.

Reflectarray 2 can be used to replace the reflectarray used in reference D1.

Figure 4:
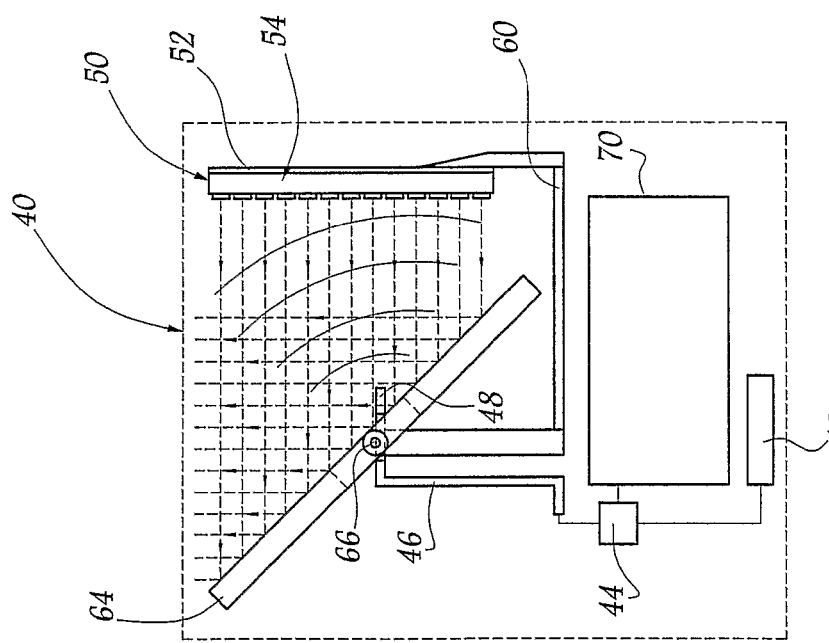
FIG. 4 is a schematic diagram of the structure of a millimetre wave radar.

FIG. 4 shows a millimetre wave radar 40 designed to detect high-voltage power lines. For example, radar 2 is intended to equip a low-flying aircraft or a helicopter.

Radar 40 has a millimetric-wave source 42 to generate an electromagnetic wave. One output of source 42 is connected through an orthomode junction 44 to an input of an open ended waveguide 46. For example, waveguide 46 is a square waveguide.

Junction 44 is designed to separate orthogonal components of a received linearly polarized electromagnetic wave. Junction 44 also transforms a generated electromagnetic wave into a linearly polarized wave.

For example, orthomode junction 44 is built from the teaching of the following reference D2:

"THE BØIFOT ORTHOMODE JUNCTION", E. J. Wollack, W. Grammer, and J. Kingsley, available through National Radio Astronomy Observatory, 919 North Cherry Avenue, Tucson, Ariz. 85721 or through Laboratory for Astronomy and Astrophysics NASA/Goddard Space Flight Center, Greenbelt, Md. 20771.

Waveguide 46 is adapted to receive two orthogonal polarizations. For example, an output 48 of waveguide 46 has a square section which works with resonant mode $TE_{10}$ and $TE_{01}$. Output 48 is placed at the focal point of a flat Fresnel reflector 50. For example, the focal length of reflector 50 is equal to 8 cm.

Reflector 50 is a reflectarray having a ground plane 52 on top of which is stacked a dielectric substrate 54. Patch elements are fixed on the front face of substrate 54 which faces output 48.

The front face and the patch elements will be described in more details in view of FIG. 6.

Reflector 50 is rigidly mounted on a support 60 with no degrees of freedom.

A rotating plane reflector 64 is also mounted on support 60 in front of reflector 50. Reflector 64 is a metallic plane, for example.

Reflector 64 can rotate around an axis 66 which is perpendicular to the propagation direction of the electromagnetic wave reflected by reflector 50.

Radar 40 also has a signal processing circuit 70 which is connected to junction 44.

Circuit 70 is designed to process each one of the orthogonal components of the received electromagnetic wave so as to detect from these components the presence or the absence of a high-voltage power line.

Figure 5:
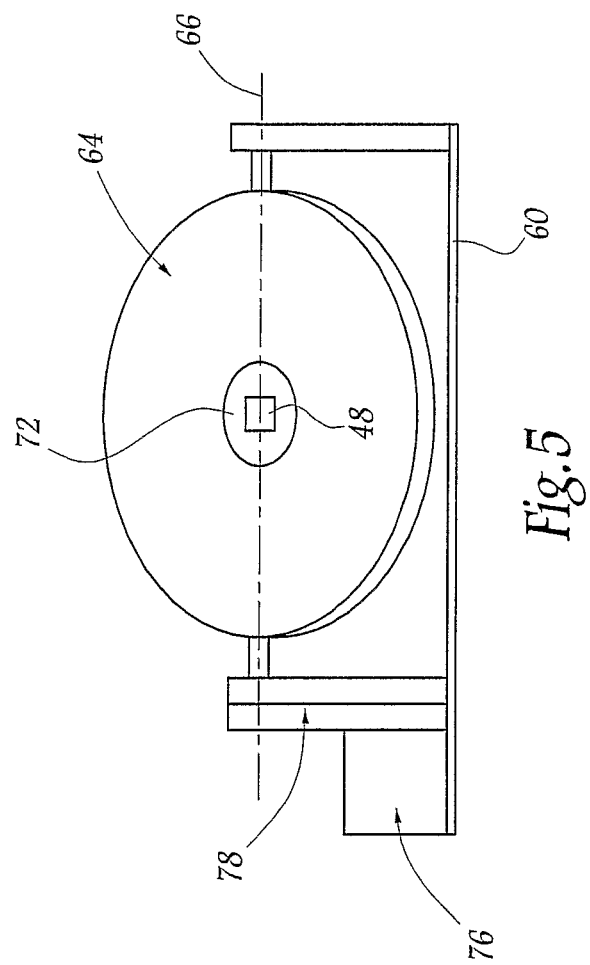
FIG. 5 is a schematic illustration of a rotatable reflector of the radar of FIG. 4.

FIG. 5 shows a front view of reflector 64. The elements already described in FIG. 4 have the same references in FIG. 5.

Reflector 64 is a flat disk with a middle hole 72. Output 48 is placed within hole 72 so as to be at the center of reflector 64.

Radar 40 has also a motor 76 to pilot a driving mechanism 78 that can rotate reflector 64 around axis 66. This is used to scan different directions with radar 40.

Figure 6:
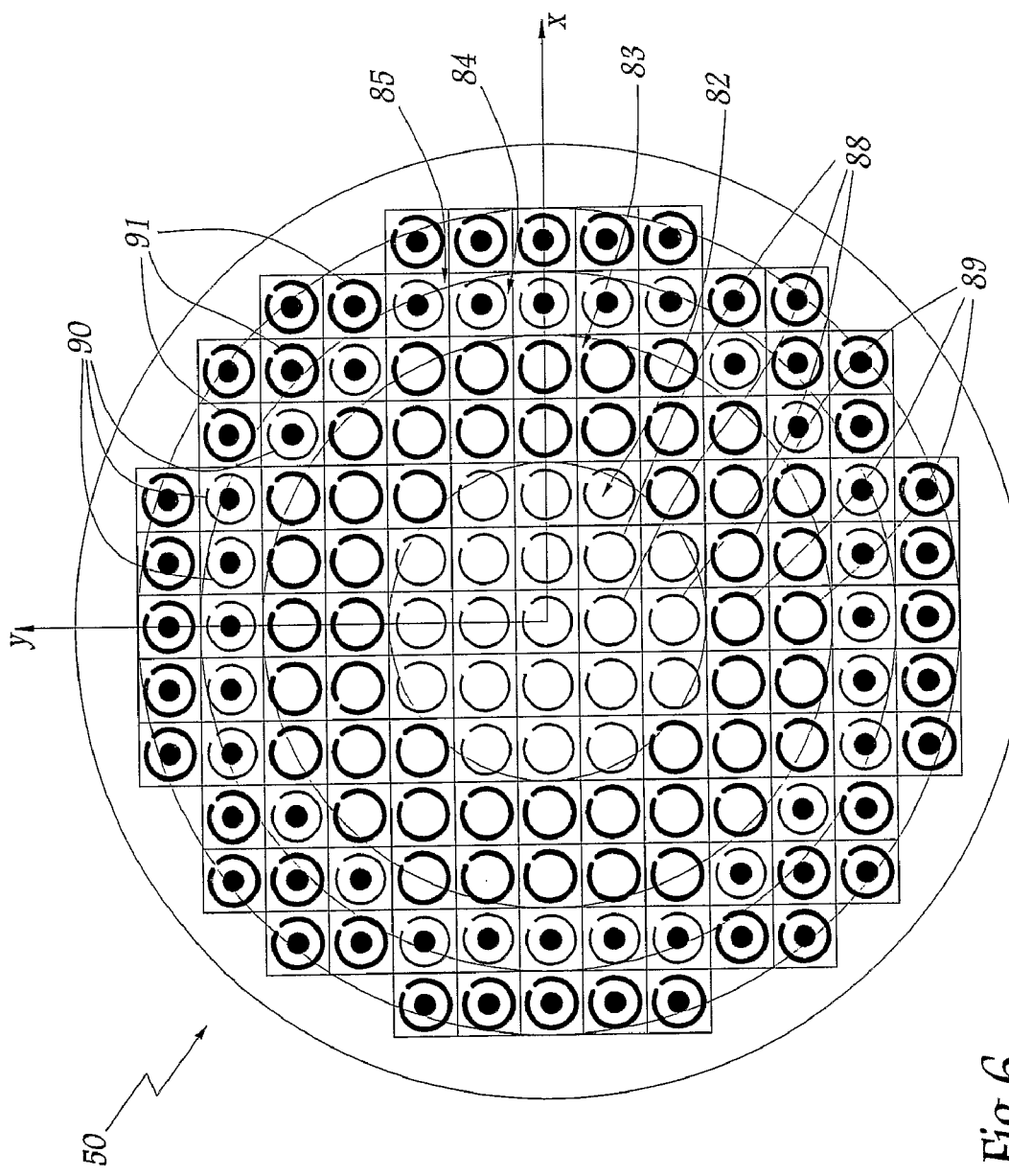
FIG. 6 is a view of a front face of a reflectarray used in the radar of FIG. 4.

FIG. 6 shows the front face of reflector 50.

As reflectarray 2, reflector 50 has four Fresnel zones 82 to 85 from the inner circular zone to the most outer annular zone. These zones 82 to 85 are used to transform spherical electromagnetic waves into plane electromagnetic waves and vice-versa.

Zones 82 to 85 correspond to phase angles 0°, 90°, 180° and 270°, respectively.

Reflector 50 is also designed to transform an incident electromagnetic wave with linear polarization into an outgoing electromagnetic wave with circular polarization and vice-versa.

To this end, zones 82 and 83 are filled with patch elements 88 and 89, respectively. Patch elements 88 and 89 have a structure similar to the one described in view of FIG. 2a. Zones 84 and 85 are filled with patch elements 90 and 91, respectively. Patch elements 90 and 91 have a structure similar to the one described in view of FIG. 2b.

The radius $r_i$ and $r_o$ of patch elements 89 to 91 is adjusted to obtain a phase difference equal to 90° between orthogonal components of the outgoing electric field.

Furthermore, radius $r_i$, $r_o$ and width h of patch elements 88 and 89 are adjusted to obtain phase angles α equal to 0° and 90°, respectively.

Similarly, radius $r_i$, $r_o$, r and width h of patch elements 90 and 91 are adjusted to obtain phase angles equal to 180° and to 270°, respectively.

x and y axes of reflector 50 are identical to x and y axes of reflector 2. Direction x is parallel to the direction of axis 66.

The incident electromagnetic wave has a linear polarization direction parallel to direction y.

To obtain an outgoing electromagnetic wave with a circular polarization, the difference of phase between two orthogonal components of the outgoing wave should be equal to + or −90° and the orthogonal components must have the same amplitude. To do so, angle i between direction $u_x$ of each patch element and direction y is chosen equal to 45°, 135°, 225° or 315°. In FIG. 6, angle i is equal to 45° for each patch element.

It should be noticed that when a reflector using patch elements having cut ring shapes is used to transform a linear polarization into a circular polarization, rotating the direction of a patch element does not modify the phase angle.

In the next part of the description, a linear polarization direction parallel to direction y is named "vertical" and a linear polarization direction parallel to direction x is named "horizontal".

Figure 7:
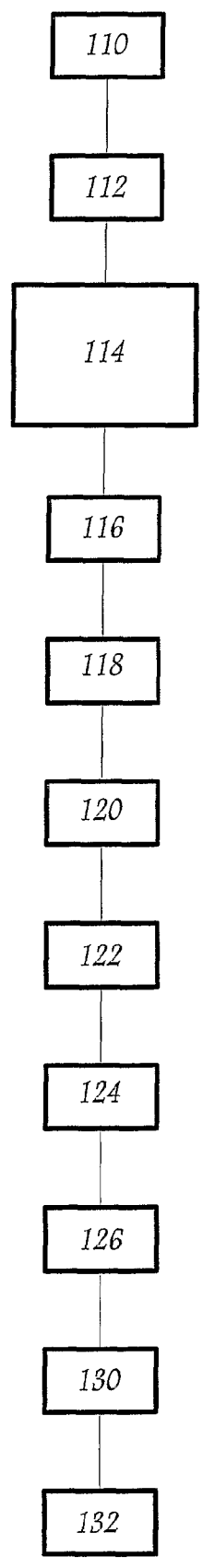
FIG. 7 is a flowchart of a method to detect a high-voltage power line using the radar of FIG. 4.

The operation of radar 40 will now be described with reference to FIG. 7.

Initially, in step 110, source 42 generates a millimetric wave which is transformed by junction 44 into a vertically polarized wave. The vertically polarized wave is guided through waveguide 46.

In step 112, the vertically polarized wave is emitted through output 48 as a spherical wave.

In step 114, the spherical wave is transformed into a plane wave by reflector 50. At the same time, reflector 50 transforms the vertical polarization into a right-hand circular polarization.

In step 116, the plan wave with a right-hand polarization is directed by reflector 64 towards a high-voltage power line.

In step 118, the line reflects an electromagnetic wave having either a right-hand or a left-hand circular polarization or a combination of right-hand and left-hand circular polarizations.

In step 120, reflector 60 directs the wave reflected by the power line toward reflector 50.

In step 122, reflector 50 focuses the planar wave onto the focal point. At the same time, left-hand circular polarization is transformed into horizontal linear polarization and right-hand circular polarization is transformed into vertical linear polarization.

In step 124, the electromagnetic wave with vertical and horizontal polarizations is received through output 48 and guided through waveguide 46 to junction 44.

In step 126, junction 44 separates vertical polarization from horizontal polarization and transmits each of them to circuit 70.

In step 130, circuit 70 builds the signature of the power line from the received electromagnetic wave with vertical and horizontal polarizations.

In step 132, if the built signature is characteristic of a power line, the presence of a power line is indicated.

Figure 8:
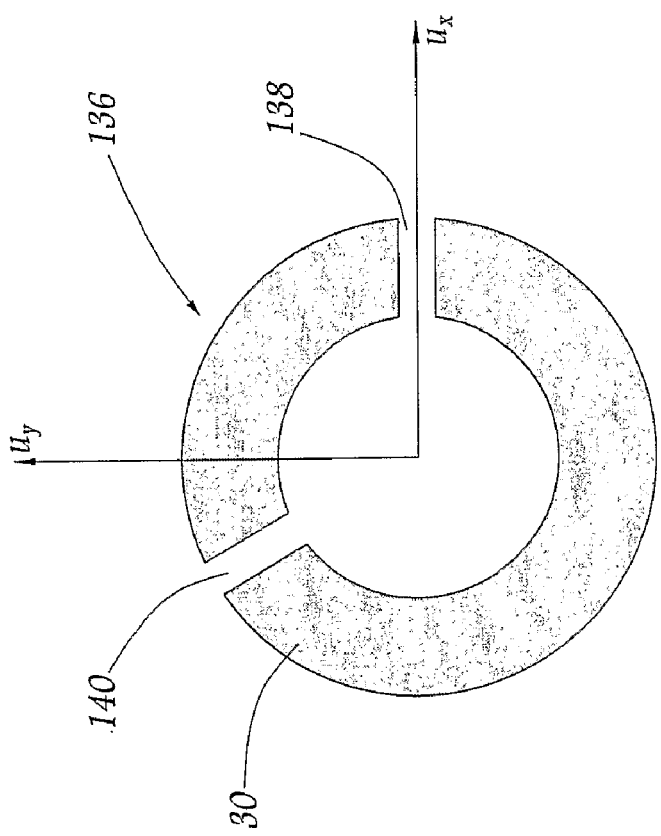
FIGS. 8 to 10 are schematic diagram of other embodiments of the patch elements used in the reflectarray of FIG. 1.

FIG. 8 shows an alternative patch element 136 which can be used in reflectarray 2 or reflector 50.

Patch element 136 differs from the patch element of FIG. 2a because it has more than one gap 32. For example, in FIG. 8, patch element 136 has two gaps 138 and 140. For example, gap 138 is aligned on direction $u_x$ whereas gap 140 is aligned on a direction which is non collinear with direction $u_y$. In this embodiment, gap 140 should not also be diametrically opposed to gap 138. Preferably, one gap 138 or 140 should not correspond to the symmetry of the other gap about one of the directions $u_x$ or $u_y$.

Figure 9:
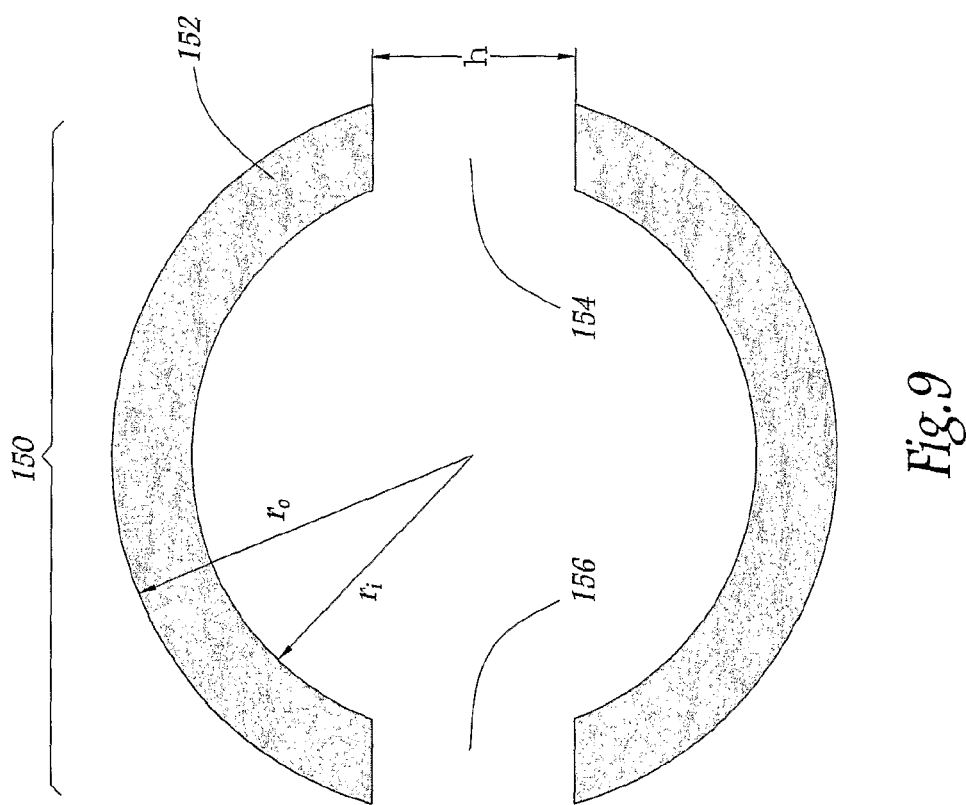

FIG. 9 shows another embodiment of a patch element 150 having a conductive annular ring 152 with two diametrically opposite gaps 154, 156. Gaps 154 and 156 have the same constant width $\underline{h}$. For example, to transform a linearly polarized incident electromagnetic wave into a circularly polarized reflected electromagnetic wave, diameter $r_o$ and $r_i$ are equal to 0.9 mm and 0.65 mm, respectively. Width $\underline{h}$ is equal to 0.5 mm.

Figure 10:
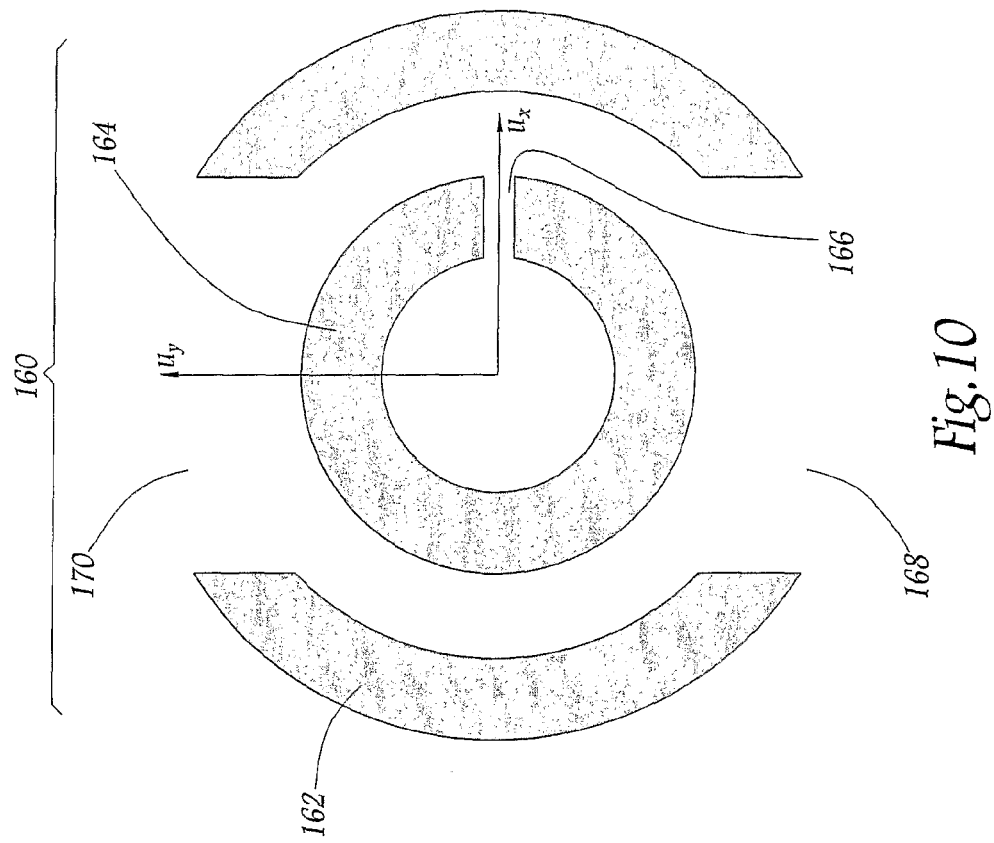

FIG. 10 shows another embodiment of a patch element 160. Patch element 160 has two concentric annular rings 162 and 164. The inner annular ring 164 has only one gap 166.

A direction $u_x$ extends from the center of ring 164 through the middle of gap 166.

Outer annular ring 162 has two diametrically opposite gaps 168 and 170 along direction $u_y$.

To obtain a phase angle α equal to 180° and a phase difference equal to 90°, the inner and outer diameters of annular ring 164 are equal to 0.3 mm and 0.5 mm. Gap 166 is 0.22 mm width. The inner and outer diameters of annular ring 162 are equal to 0.7 mm and 0.9 mm, respectively. Gaps 168 and 170 are 1.25 mm width.

In the embodiment of FIG. 10, the direction $u_y$ which extends through gap 168 and 170 is not collinear to direction $u_x$. Preferably, directions $u_x$ and $u_y$ are orthogonal. However, in another embodiment, direction $u_y$ and $u_x$ can be collinear.

Preferably, each gap of the same annular ring has the same width. However, in another embodiment, different gaps of the same conductive ring may have different widths.

Many additional embodiments are possible. For example, the dimension of the patch element of FIGS. 2a, 2b and 8 can be changed according to the frequency of the electromagnetic wave to be reflected.

Waveguide 46 may be replaced by two waveguides, one for receiving only the vertical polarization and the other one for receiving only the horizontal polarization.

Orthomode junction 44 may be replaced by other means to carry out the same functions.

Reflector 64 may, if necessary, be mounted on support 60 so as to rotate around at least two non collinear axes. For example, reflector 64 rotates around axis 66 and an other axis perpendicular to axis 66.

The invention claimed is:

1. A reflectarray comprising an array of patch elements (10-13; 89, 91), each patch element being designed to shift a phase of an incident polarized electromagnetic wave by a predetermined phase angle α, and each patch element having a cut ring shape (28) formed of a conductive ring (30) with at least one crossing gap (32), the conductive ring having an outer diameter $r_o$ and an inner diameter $r_i$ and each crossing gap having a respective width $\underline{h}$, wherein diameters $r_o$, $r_i$ and width $\underline{h}$ are adjusted so that a phase shift β defined by the following relations is different from zero:

$$\phi(E_{ox}) = \phi(E_{ix}) + \alpha \quad (1)$$

$$\phi(E_{oy}) = \phi(E_{iy}) + \alpha + \beta \quad (2)$$

where:

and $E_{ix}$ and $E_{iy}$ are the orthogonal components of the incident polarized electromagnetic wave collinear with directions $u_x$ and $u_y$, respectively, $E_{ox}$ and $E_{oy}$ are the orthogonal components of the reflected polarized electromagnetic wave collinear with directions $u_x$ and $u_y$ respectively, $\phi(E_{ox})$ and $\phi(E_{oy})$ are the phases of the orthogonal components $E_{ox}$ and $E_{oy}$ respectively, and $\phi(E_{ix})$ and $\phi(E_{iy})$ are the phases of the orthogonal components $E_{ix}$ and $E_{iy}$ respectively.

2. The reflectarray according to claim 1, wherein diameters $r_o$, $r_i$ and width $\underline{h}$ are adjusted so that $\phi(E_{ox})$ $\phi(E_{oy}) = \pm 90°$ from an incident electromagnetic wave with a linear polarization.

3. The reflectarray according to claim 1, wherein phase shift β is equal to 180°.

4. The reflectarray according to claim 1, wherein none of the crossing gap is diametrically opposite to another crossing gap of the same conductive ring.

5. The reflectarray according to claim 1, wherein the conductive ring has only one crossing gap (32).

6. The reflectarray according to claim 1, wherein the patch element has only one conductive ring.

7. The reflectarray according to claim 1, wherein at least one patch element has an inner disk (34) within its conductive ring.

8. The retlectarray according to claim 1, wherein the parch elements are arranged into P Fresnel zones (69; 82-35) P being an integer number greater or equal to four and the radius ($r_n$) of each Fresnel zone being given by the following relation:

$$r_n \sqrt{\frac{2nf\lambda}{P} + (n\lambda/P)^2}$$

where:
- n is the rank order of the Fresnel zones, n=1 corresponding to the most inner Fresnel zone;
- $\lambda$ is the wavelength of the electromagnetic wave;
- f is the focal length of the reflectarray;
- P is the number of Fresnel zones used;
- every patch element placed into the same Fresnel zone are designed to shift the phase of the incident polarized electromagnetic wave by the same predetermined phase angle $\alpha$, and patch elements of different Fresnel zones are designed to shift the phase of the incident electromagnetic wave by different predetermined phase angles $\alpha$.

9. The refiectarray according to claim 1, wherein the direction $u_x$ is defined by the line that extends front the center of the conductive ring through one gap, wherein the direction $u_x$ of some patch elements are rotated with respect to the direction $u_x$ of other patch elements to adjust the phase angle of the rotated patch element.

10. The reflectarray according to claim 1, wherein each patch element is a printed microstrip element directly on top of a dielectric substrate (54), a ground plane (52) being fixed directly at the bottom of the dielectric substrate.

11. A millimeter wave radar comprising:
a primary source (46) to radiate a linearly polarized electromagnetic wave, the linear polarization being parallel to a direction y,
a reflectarray (50) according to any one of the preceding claims,
wherein:
each cut ring shape (28) is formed of a conductive ring (30) with at least one crossing gap (32), and each patch element (89-91) has a direction $u_x$ defined by a line that extends from the center of the conductive ring through one crossing gap, the direction $u_x$ being non-collinear with direction y, and
the inner and outer diameters $r_0$, $r_i$ and width $\underline{h}$ of each patch element are adjusted so that the phase difference between two orthogonal components of the reflected polarized electromagnetic wave is different from 0° and 180°.

12. The radar according to claim 11, wherein the inner and outer diameters $r_0$, $r_i$ and width $\underline{h}$ are adjusted so that the predetermined phase difference between the two orthogonal components of the reflected polarized electromagnetic wave is equal to +90° or −90°, and the direction $u_x$ of each patch element (89-91) is tilted by 45°, 135°, 225° or 315° with respect to direction y.

\* \* \* \* \*